US009289888B2

(12) United States Patent
Kästner

(10) Patent No.: US 9,289,888 B2
(45) Date of Patent: Mar. 22, 2016

(54) SCREW TENSIONING DEVICE

(75) Inventor: Lars Kästner, Dresden (DE)

(73) Assignee: ITH GMBH & CO. KG, Meschede (DE)

( * ) Notice: Subject to any disclaimer, the term of this patent is extended or adjusted under 35 U.S.C. 154(b) by 440 days.

(21) Appl. No.: 13/703,902

(22) PCT Filed: Jun. 15, 2011

(86) PCT No.: PCT/DE2011/075133
§ 371 (c)(1),
(2), (4) Date: Dec. 13, 2012

(87) PCT Pub. No.: WO2012/022319
PCT Pub. Date: Feb. 23, 2012

(65) Prior Publication Data
US 2013/0087022 A1 Apr. 11, 2013

(30) Foreign Application Priority Data
Jun. 16, 2010 (DE) .......................... 10 2010 017 403

(51) Int. Cl.
*B25B 29/02* (2006.01)
*B23P 19/06* (2006.01)
(52) U.S. Cl.
CPC ............... *B25B 29/02* (2013.01); *B23P 19/067* (2013.01)
(58) Field of Classification Search
CPC .... B25B 29/02; B25B 23/14; B25B 23/1425; B23P 19/067; Y02E 30/40
USPC ............ 81/57.14, 57.22, 57.24, 57.36, 57.38, 81/57.39, 57.4
See application file for complete search history.

(56) References Cited

U.S. PATENT DOCUMENTS 4,581,956 A * 4/1986 Robert .......................... 81/57.38
4,794,826 A * 1/1989 Franks .......................... 81/57.39

FOREIGN PATENT DOCUMENTS

GB  1511300 A  5/1978
GB  2295433 A  5/1996

*Primary Examiner* — Robert Scruggs
(74) *Attorney, Agent, or Firm* — Michael Soderman

(57) ABSTRACT

The invention relates to a novel screw tensioning device with a screw tensioning cylinder with a high-pressure hydraulic pump for pretensioning screws and loosening extremely secure pretensable screw connections and an accompanying control method.
The problem is to create a screw tensioning device that can generate high tensioning forces, that requires less energy, that can be used for all usage locations without problems, that can be easily controlled and that makes precisely controlled pretensioning possible.
A high-pressure hydraulic pump 39 is integrated into the interior of the screw tensioning cylinder 38 in accordance with the invention. This high-pressure pump 39 is connected to a sealed hydraulic accumulator 42. A drive unit 40 that can be pneumatically actuated is arranged on or in the screw tensioning cylinder 38. The drive unit 40 can be designed on the constructional basis of a diaphragm cylinder 42 or on the basis of a piston cylinder. The pneumatic drive unit 40 is connected to a compressed air feed device to actuate it. The pretensioning force is brought about through the high-pressure pump 39 by means of an oscillating high-pressure piston that moves the working piston 15. The difference is that the high required hydraulic pressure of up to 1000 bar and beyond, if necessary, is not provided via an additional, expensive, separate high-pressure system, but is instead created in a specially designed screw tensioning cylinder 38 itself. Other pressure-control valves are arranged in such a way that the novel, single-action control method for the screw tensioning device makes universal use in any desired usage locations possible.

3 Claims, 3 Drawing Sheets

SCREW TENSIONING DEVICE

CROSS REFERENCE TO RELATED APPLICATIONS

This application is the U.S. national stage of International Application No. PCT/DE2011/075133, filed on Jun. 15, 2011, and claims the benefit thereof. The international application claims the benefits of German Application No. 102010017403.3 filed on Jun. 16, 2010; all applications are incorporated by reference herein in their entirety.

BACKGROUND

The invention relates to a novel screw tensioning device with a screw tensioning cylinder with a high-pressure hydraulic pump for pretensioning screws and loosening extremely secure pretensable screw connections and a method for controlling this screw tensioning device.

In addition to the basic forms of various screw connections, so-called extremely secure pretensable screw connections have already been used for decades, above all in steel construction. Various screw tensioning devices exist for that. These screw tensioning devices all operate according to the same well-known principle as a rule based on torque-free pretensioning methods. A screw tensioning cylinder supported on the component or machine part that is to be tensioned is screwed onto the thread end over the nut of a threaded bolt to be tensioned with a movable working piston or a threaded bushing located in the working piston here. After that, a high-pressure hydraulic pump is connected to the screw tensioning cylinder that pressurizes the piston-ring side and consequently brings about a retraction of the working piston and the pretensioning of the threaded bolt. The threaded bolt retains its pretensioned force and tensions the machine part after the pressure is released on the piston-ring side because of the turning of the nut onto the machine part as far as it will go. Hydraulic screw tensioning devices with a multi-stage design are described, for example, in DE 10 2004 043 145 B3, in DE 196 38 901 A1 and in GB 22 91 155 A. The single-stage design is described in detail in EP 0 200 459 A2, for instance. A method for connecting or fastening components using an extremely secure pretensable connection is achieved in EP 2 014 932 A2 that is supposed to make especially favorable controlled pretensioning possible. In so doing, a special dimensioning of the projecting screw shaft and the nut with the aid of an oversized washer is proposed. A unit based on a hydraulically actuated screw tensioning cylinder in the form of a screw tensioning device is also discussed in this technical solution. This design is only suitable for certain specially pretensioned screw connections, though, and it is not universally applicable.

The advantages of the extremely secure pretensioning method vis-a-vis the tightening of the screw connection by solely applying a torque to the nut basically involve the fact that the threaded bolt is not additionally stressed with torsion during the tightening process and that no frictional forces arise in the threading and on the nut support. It is possible because of this to realize considerably higher pretensioning forces in the screw connection vis-a-vis a normal tightening of the nut and to effectively increases its load-bearing capability. Very large variations in the frictional forces especially arise, based on experience, in large thread diameters over 30 mm, which is why the load-bearing capability is significantly reduced when the nut is tightened by means of a pure torque.

In addition to the advantages that were described, the hydraulic screw tensioning devices in the prior art have a significant drawback in that additional, cost-intensive high-pressure hydraulic pumps are required to operate the devices. High-pressure hydraulic lines, frequently even very long hydraulic lines on top of that, are likewise required to connection the pump and the screw tensioning device. The bulky hydraulic lines especially lead to problems and to time-consuming preparatory work when there are cramped space circumstances, for instance in the gondola of a wind energy system where systems of this type are frequently used. The lines can only be laid with relatively large radii, because they are not permitted to be crimped, resulting in large space requirements.

Several extremely secure screw connections have to frequently also be tightened with the same number of screw tensioning devices, which is why substantial expenses can arise in the preparation of the hydraulic lines and in their installation on site. Moreover, the pump has to also be transported to the respective assembly location and appropriate supplied with sufficient energy there. The problem of additional equipment becomes particularly clear when there is work under water, as frequently arises in the offshore industry, for instance. Very long high-pressure lines from the pump are required from a ship or other platform out to the assembly location under water here. Hydraulic fluids are also damaging to the environment as a rule and therefore require a series of time-consuming, cost-intensive measures for certain applications.

There are also applications where the use of hydraulic liquids is only approved under strict safety conditions in general.

SUMMARY

The invention relates to a novel screw tensioning device with a screw tensioning cylinder with a high-pressure hydraulic pump for pretensioning screws and loosening extremely secure pretensable screw connections and an accompanying control method.

The problem is to create a screw tensioning device that can generate high tensioning forces, that requires less energy, that can be used for all usage locations without problems, that can be easily controlled and that makes precisely controlled pretensioning possible.

A high-pressure hydraulic pump 39 is integrated into the interior of the screw tensioning cylinder 38 in accordance with the invention. This high-pressure pump 39 is connected to a sealed hydraulic accumulator 42. A drive unit 40 that can be pneumatically actuated is arranged on or in the screw tensioning cylinder 38. The drive unit 40 can be designed on the constructional basis of a diaphragm cylinder 42 or on the basis of a piston cylinder. The pneumatic drive unit 40 is connected to a compressed air feed device to actuate it. The pretensioning force is brought about through the high-pressure pump 39 by means of an oscillating high-pressure piston that moves the working piston 15. The difference is that the high required hydraulic pressure of up to 1000 bar and beyond, if necessary, is not provided via an additional, expensive, separate high-pressure system, but is instead created in a specially designed screw tensioning cylinder 38 itself. Other pressure-control valves are arranged in such a way that the novel, single-action control method for the screw tensioning device makes universal use in any desired usage locations possible.

DETAILED DESCRIPTION

The invention is based on the problem of creating a novel screw tensioning device that can generate the same high tensioning forces as screw tensioning devices for extremely secure pretensable screw connections operating on a hydraulic basis up to now that requires less energy, that can be used without problems for all usage locations and that makes an accompanying control process possible for precisely controlled pretensioning.

The problem is solved in accordance with the invention with the features of the first and fifth claims. The novel screw tensioning device for pretensioning and loosening extremely secure pretensable screw connections consists of a screw tensioning cylinder 38 and a high-pressure hydraulic pump 39. The screw tensioning cylinder 38 is designed and structured in such a way here that a high-pressure hydraulic pump 39 is integrated into the interior of the screw tensioning cylinder 38. This high-pressure hydraulic pump 39 is connected to a sealed hydraulic accumulator 42. A drive unit 40 that can be pneumatically actuated is arranged on or in the screw tensioning cylinder 38. The pneumatic drive unit 40 can be designed, as a choice, on the constructional basis of a diaphragm cylinder 42 or on the basis of a piston cylinder. The pneumatic drive unit 40 is connected to a compressed air feed device to actuate it. The tightening and loosening are carried out in the novel screw tensioning device in accordance with the invention according to the procedure that is already known in and of itself of precisely tensioning the screw to the desired pretensioning force by means of a hydraulic screw tensioning device; the screw tensioning device is supported on the component 1 or machine part to be tensioned, and the nut of the extremely secure tensionable screw connection is subsequently tightened or loosened without a load. The screw tensioning device in accordance with the invention differs from the known devices in that the high required hydraulic pressure of up to 1000 bar and beyond, if necessary, is not provided via an additional, expensive, separate high-pressure system, but is instead created in a specially designed screw tensioning cylinder 38 itself.

The installation and construction of the high-pressure pump 39 driven via compressed air leads to novel design of the screw tensioning cylinder 38. Compressed air up to approx. 10 bar is only required to drive the novel screw tensioning cylinder 38. The compressed air can be supplied here via a simple and cost-effective compressor or via a handy, appropriately filled compressed air bottle.

The integrated high-pressure hydraulic pump 39 is realized by attaching a pneumatic cylinder to the upper end of the screw tensioning cylinder 38 that can be designed in the form of a diaphragm cylinder 41 or a piston cylinder. A piston rod is attached to this pneumatic cylinder that plunges into the movable working piston 15 of the screw tensioning cylinder 38 and acts as a displacing piston or high-pressure piston 9. The ratio of the pressure intensification between the hydraulic pressure and the pneumatic pressure is determined in connection with this by the area ratio between the pneumatic cylinder and the displacing piston.

Two check valves 16 and 19 are arranged in the movable working piston 15 in such a way that the displaced hydraulic volume is pumped into the piston-ring space 43, and hydraulic fluid flows from the piston space 44 into the working piston 15 with the return stroke of the displacing piston. Pumping action is brought about because of this, and the working piston 15 retracts until force equilibrium is established in the system. The tensile force on the working piston 15 and consequently the pretensioning force in the threaded bolt 2 can be defined by setting the respective air pressure.

The external high-pressure hydraulic pump and the high-pressure lines are saved in full because of the screw tensioning cylinder 38 operated by compressed air with the design in accordance with the invention. The work is simplified to a considerable extent and costs can be substantially reduced because of that. A very compact, internal high-pressure pump is now integrated into the specially designed screw tensioning cylinder 38 instead of the external high-pressure hydraulic pump.

In a preferred design form of the screw tensioning device for pretensioning and loosening extremely secure pretensable screw connections in accordance with the invention, an appropriately filled compressed-air bottle is connected via an air-pressure control and air-pressure adjustment valve as a compressed air feed device. This has the advantage that no long pneumatic hoses at all have to be used, on the one hand, and an external energy source can be completely eliminated.

In a further design form of the screw tensioning device for pretensioning and loosening extremely secure pretensable screw connections in accordance with the invention, an air compressor is connected via an air compressor control and air compressor adjustment valve as a compressed air feed device. That is useful, among other times, when several screw tensioning devices have to be pressurized at the same time, for instance.

The advantages are that only a handy compressed-air bottle with a corresponding pressure-control valve or a correspondingly more powerful air compressor is required instead of the external high-pressure hydraulic pump or, as the case may be, only handy and cost-effective compressed-air hoses are required to connect the screw tensioning device to the compressed-air supply instead of the difficult-to-handle high-pressure hydraulic lines. When several screw tensioning devices are used at the same time, the required connections can likewise be made with easy-to-handle compressed-air houses that can also be cut to fit on site with little expense and connected via standard plug-type connectors. The compressed-air houses can be bent more tightly than hydraulic hoses and require significantly less space during transport in connection with this and can also be laid while pressurized in operation with tight radii and even around corners.

The screw tensioning device for pretensioning and loosening extremely secure pretensable screw connections in accordance with the invention can be designed in a particularly handy form when the hydraulic accumulator 42 for the integrated hydraulic pump is arranged on the inside of the screw tensioning cylinder 38 itself in a suitable place. That is above all favorable for achieving a hermetic encapsulation of the hydraulic pump.

The process in accordance with the invention for controlling a screw tensioning device for pretensioning and loosening extremely secure pretensable screw connections operates, as is known in and of itself, with a hydraulic pump. The hydraulic pump is designed in the form of a specially constructed high-pressure pump 39 inside of the screw tensioning cylinder 38 that is pressurized in a pulsed way with a pneumatically generated pressure. A high-pressure piston 9 is centrally arranged here in such a way that it is pressurized with pneumatic pressure on one side via the diaphragm cylinder 41; it carries out a pumping movement and, on the other side, presses the hydraulic fluid of the high-pressure pump 39 out of the hole in the working piston 45 into the piston-ring space and brings about outward movement of the working piston 15. An oscillating movement of the high-pressure piston 9 is created because of the repeated pressurization in the diaphragm cylinder 41, and the desired pressure is built up in the piston-ring space 43 via blocking with the check valves 19 and 16. The pulsed pressure is generated by means of a signal that switches a pneumatic valve 47 through the control line 46 and thereby interrupts and vents the supply of compressed air to the diaphragm cylinder 41. The switching signal is generated when the end position of the diaphragm cylinder 41 is reached here by raising the valve disk 12 via the opening pins 18 and opening the vent holes 14.

The switching signal that is generated is routed to the pneumatic valve 47 through the control line 46. The check valve 48 located in the control line 46 presents a return flow of the compressed air. The time period of the pressure reduction is set in the control line 46 via an adjustable throttle valve 49; the pneumatic valve 47 is repeatedly reset with that. The pumping process is repeated until force equilibrium is established between the force in the diaphragm cylinder 41 and at the high-pressure piston 9 in the hole in the working piston 45. The pneumatic drive unit 40 is switched off and on by means of a pneumatic valve 50 that can be manually actuated and that is connected to the pneumatic valve 47; the pressure is set via an upstream pressure-control valve.

The essential advantage of the screw tensioning device and the accompanying control process in accordance with the invention is above all that no hydraulic pumps located far outside and no bulky high-pressure hydraulic lines are required, that very high tensioning forces can be generated with an economical use of energy, that the desired pretensioning force can be provided in a very simple and highly precise way by setting the pneumatic pressure on site and that a very compact, universally handy screw tensioning device was created for use at any usage sites desired, for instance under water or in cramped assembly locations or at locations without an additional energy supply.

Only a very small amount of hydraulic fluid that is damaging to the environment is used, in contrast to devices that have been used up to now. Moreover, hermetic encapsulation exists, so hydraulic fluid cannot get into the environment.

BRIEF DESCRIPTION OF THE DRAWINGS

The invention is explained in more detail below with the aid of an example. The sectional views shown in FIG. 1, FIG. 2 and FIG. 3 will assist in this.

DETAILED DESCRIPTION OF THE PREFERRED EMBODIMENT

Figure 1:
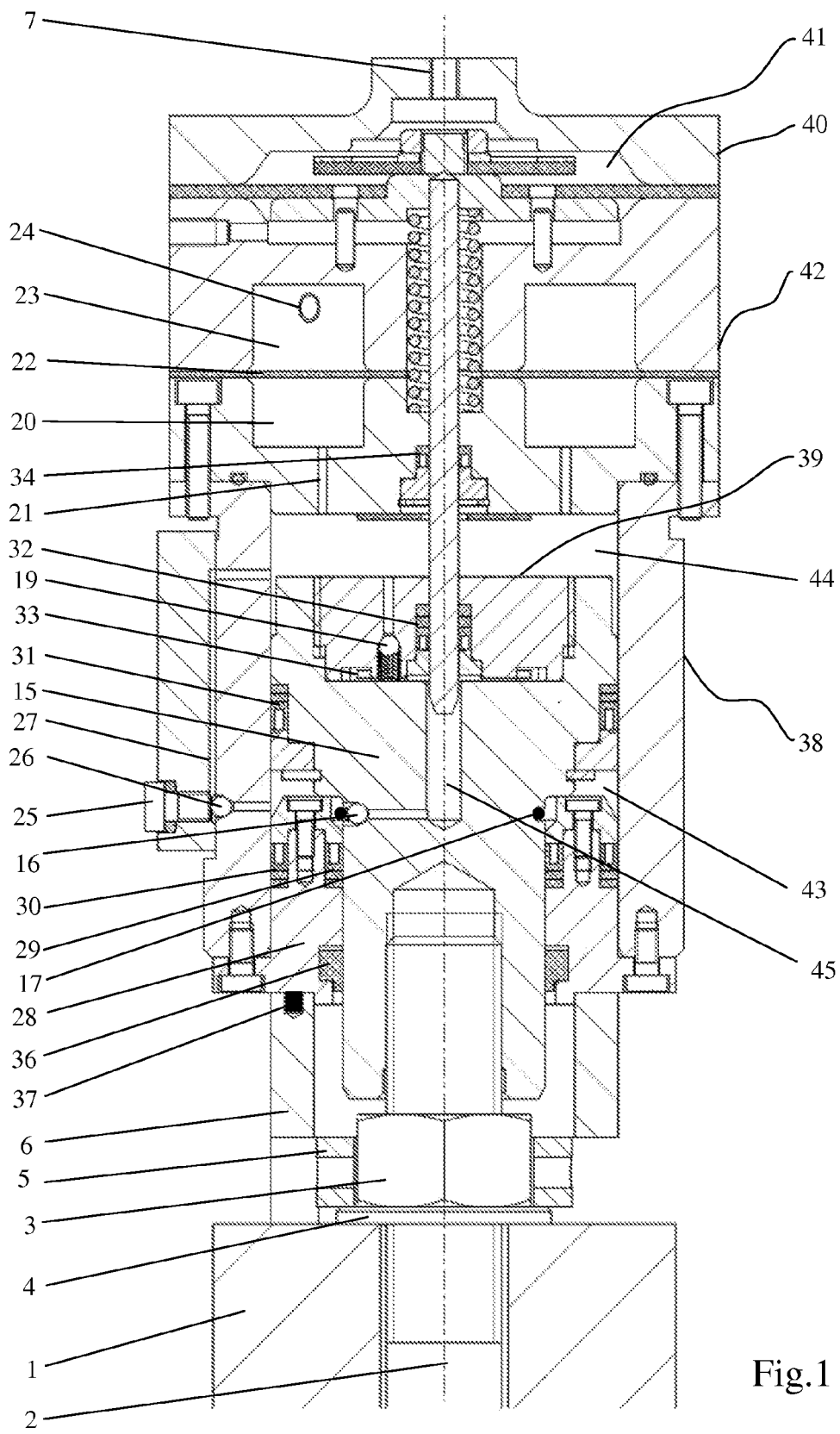
FIG. 1 shows a sectional view of a screw tensioning device

A component 1 to be tensioned in an extremely secure way, which could involve the rotor blade of a wind energy system or the accompanying roller bearings, for instance, is to be tensioned via the threaded bolt 2 and the nut 3. The nut 3 will first be screwed by hand onto the threaded bolt 2 with a washer 4 that can optionally be used. After that, the hexagon socket 5 is pushed over the nut 3 to later turn the nut 3, and the entire screw tensioning device is then screwed onto the projecting end of the threaded bolt 2. The counterbearing 6, which the screw tensioning device uses to support itself against the component 1 to be tensioned, is provided with permanent magnets 37 distributed around the circumference in the direction of the screw tensioning cylinder 38 and with dimensions in accordance with the overall size of the screw tensioning device here; the counterbearing 6 sticks to the screw tensioning cylinder 38 because of that and handling is consequently easier.

Simple exchangeability of counterbearings 6 with different dimensions for different embodiments of the screw connection in the length of the projecting threaded portion of the threaded bolt 2 or the corresponding nut height or the washer 4 likewise exists because of this. The counterbearing 6 is supplied with suitable recesses so that it can turn the nut 3 onto the component or machine part 1 to be tensioned after pretensioning is done. The screw tensioning device consists of a counterbearing 6 and the screw tensioning cylinder 38 that actually has a special design. The screw tensioning cylinder 38 consists of a housing with a high-pressure hydraulic pump 39 including a hydraulic accumulator 42 arranged in an integrated fashion in its interior and with a pneumatic drive unit 40 in the header part. A compressed-air connection 7 to which a compressed air feed device is connected is arranged at the top of the screw tensioning cylinder 38 on the pneumatic drive unit 40. The air pressure required in each case for the extremely secure pretensioning is supplied through that. The pretensioning force that is desired in each case is defined by the air pressure correspondingly set in the pneumatic drive unit 40.

An advantage is that the pretensioning force can be continuously set at a very high level of precision in a simple way in the process. A compressive force is exerted on these parts because of the compressed air acting on the sealing disk 12 and the diaphragm 11 in the diaphragm piston 41; the plate 8 that is firmly connected to the high-pressure piston 9 and therefore the high-pressure piston 9 of the pneumatic drive unit 40 move downwards against the force of the pretensioned compression spring 10. The diaphragm 11 made of an elastomer seals the pressurized space of the diaphragm cylinder 41 towards the outside and towards the interior space in the diaphragm cylinder 41 here. The sealing disk 12 that likewise consists of an elastomer is provided with a metallic support ring 13 and is pressed by the air pressure onto the diaphragm 11 and thereby seals the vent holes 14. The hydraulic fluid in the hole of the working piston 15 is displaced because of the plunging movement of the high-pressure piston 9 and pumped through the opening check valve 16 into the piston-ring space 43. Two check valves 16 and 19 preferably act in such a way in the movable working piston 15 that the one check valve 19 is closed when the high-pressure piston 9 plunges and the other check valve 16 is open, so the displaced hydraulic fluid is pressed into the piston-ring space 43 of the screw tensioning cylinder 38.

With the return stroke of the high-pressure piston 9, the check valve 16 now closes and the check valve 19 opens, so hydraulic fluid can flow out of the working piston space into the hole 45 of the working piston 15.

Figure 2:
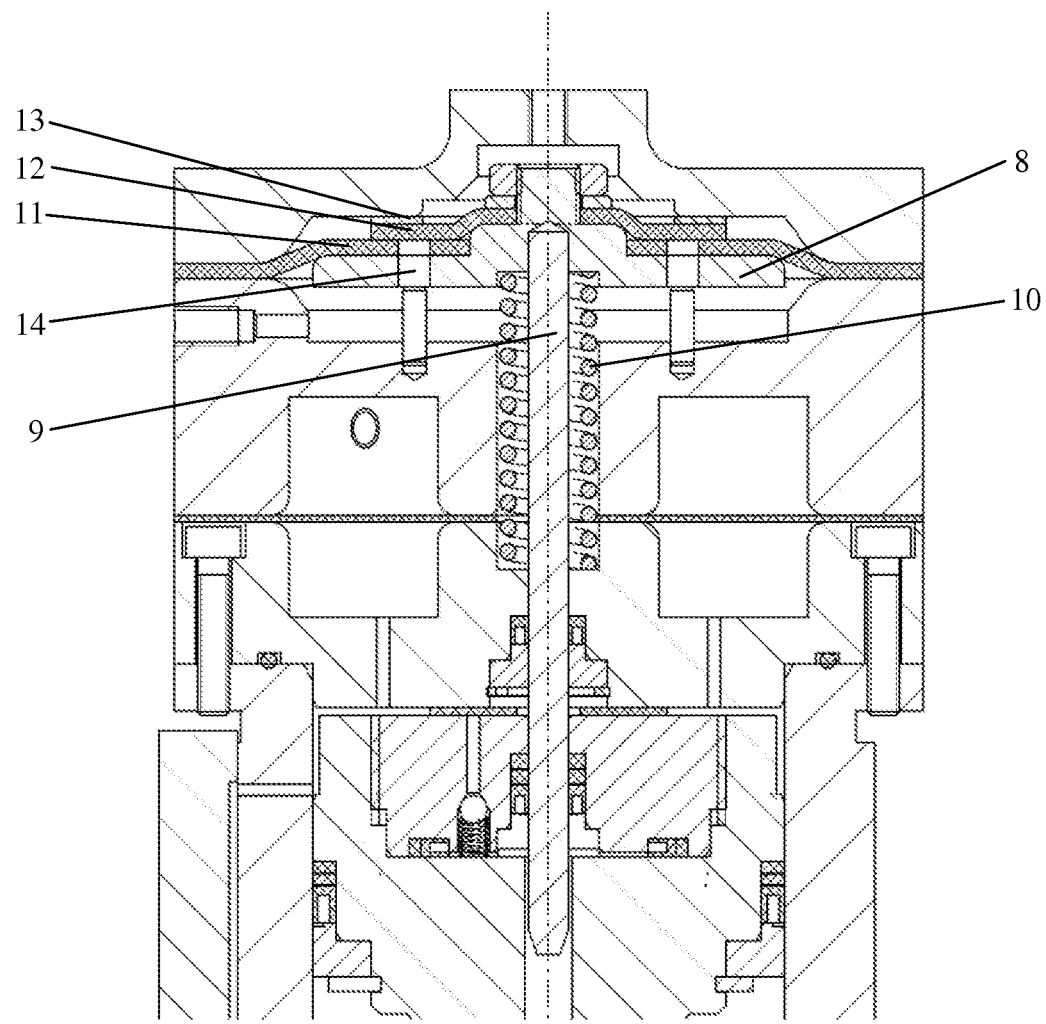
FIG. 2 shows a pneumatic drive unit 40 based on a diaphragm cylinder 41 in the upper end position of the diaphragm 11
Figure 3:
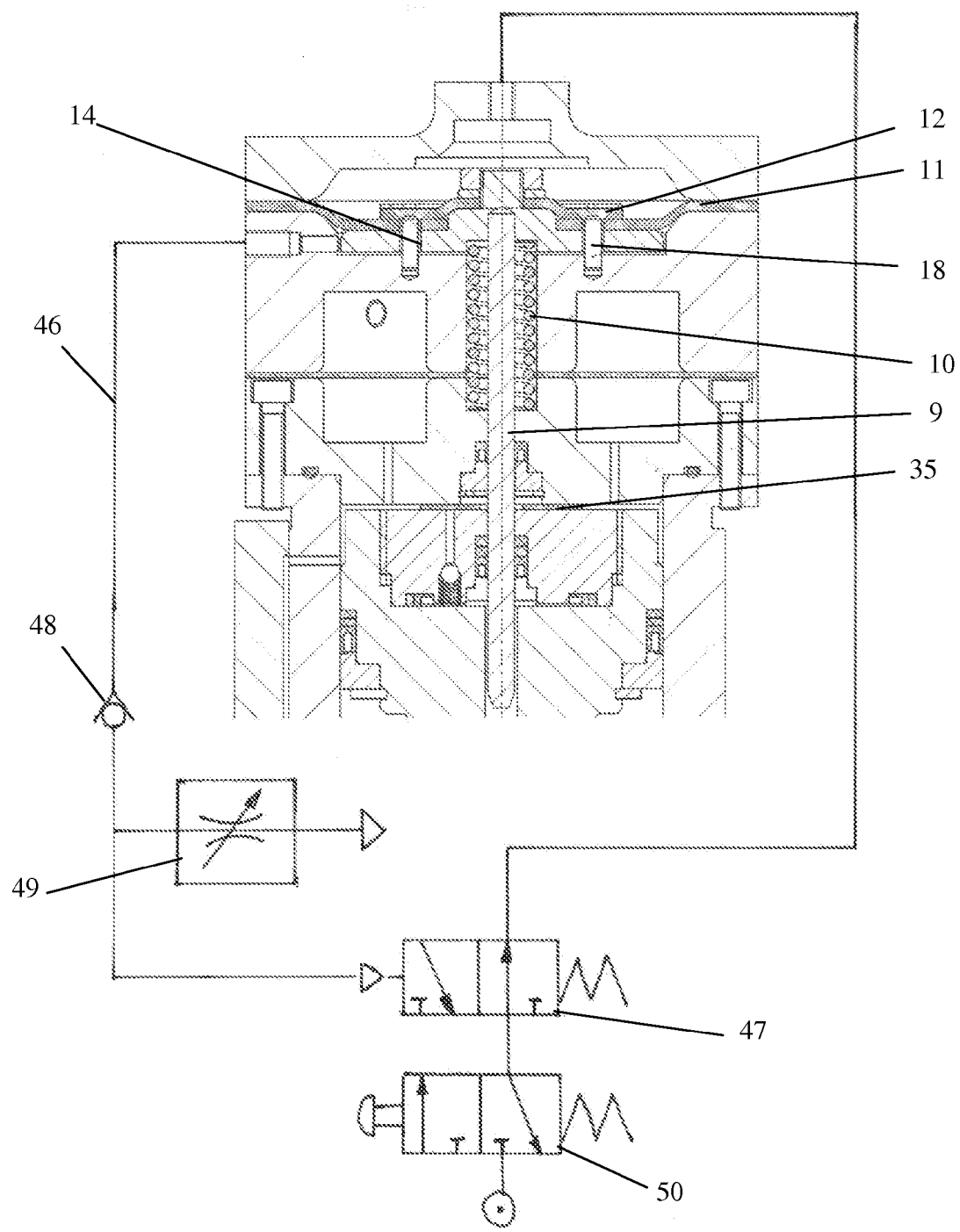
FIG. 3 shows a pneumatic drive unit 40 based on a diaphragm cylinder 41 with the accompanying control elements in the upper end position of the working piston 15 of the high-pressure hydraulic pump 39

The check valve 16 is closed again after the plunging process ends because of the elastomer ring 17 abutting the sealing element and the pressure that is generated in the piston-ring space 43. The plunging movement of the high-pressure piston 9 is ended when, as shown in FIG. 3, the opening pins 18 lift the sealing disk 12 from the diaphragm 11 and open the vent holes 14. A pressure signal is generated in the control line 46 because of this; the pneumatic valve 47 is closed due to that, and the compressed-air connection 7 is vented, so the air in the diaphragm cylinder 41 can escape. In the process, the pretensioned compression spring 10 now presses the high-pressure piston 9 along with the plate 8 that is fastened to it, the diaphragm 11, the sealing disk 12 and the support ring 13 back into the upper end position, as shown in FIG. 2. The external check valve 48 prevents the control line 46 from likewise being vented in the process and prevents the pneumatic valve 47 from opening too early again. The time period for the venting of the control line 46 and consequently the point in time for the opening of the pneumatic valve 47 can be precisely set via the throttle valve 49.

The speed of the pumping process in the internal high-pressure hydraulic pump 39 can be regulated in this manner. The pneumatic valve 50, which can optionally also be manually actuated, serves to switch the pumping process on and off. A further upstream pressure-control valve with the desired operating pressure is connected to this pneumatic valve 50 that can be manually actuated, and the pretensioning force of the entire screw tensioning device can therefore be precisely set (not numbered in the drawing in FIG. 3). When the upper end position is reached, the sealing disk 12 is pressed onto the diaphragm 11 again and closes the vent holes 14 once again. The air pressure in the space of the diaphragm cylinder 41 can then build up again, and the process starts from anew. Pumping action is achieved with the back-and-forth movement of the high-pressure piston 9, causing hydraulic fluid in the piston space 44 to be pumped into the piston-ring space 43 and the movable working piston 15 is moved away from the threaded bolt and the desired high pretensioning force is generated in the process.

The air flow at the compressed-air connection 7 is set via a throttle valve in such a way that the desired operating speed of the system is achieved. Low pressure is generated in the hole 45 of the working piston 15 during the outward movement of the high-pressure piston 9. The check valve 19 opens because of this low pressure and the initial hydraulic pressure in the piston space 44; hydraulic fluid can flow into the hole 45 of the working piston 15 because of that. The initial pressure acting through the supply connection 24 also consequently brings about a quick filling of the hole 45 in the working piston 15 via the check valve 19 during the outward movement (return stroke) of the high-pressure piston 9.

The difference between the piston area and the piston-ring area has to be equalized during the retraction of the working piston 15. This means that the volume of the retracting piston rod of the working piston 15 has to be equalized on the piston-space side. The volume equalization space 20, which serves as a hydraulic accumulator 42, which is filled with hydraulic fluid and which is connected to the holes 21 with the piston space 44, serves to do this. The equalization diaphragm 22, made up of an elastomer, serves to seal off the hydraulic accumulator 42 vis-a-vis the air reservoir 23 over the volume equalization space 20. A desired air pressure up to a maximum of 10 bar is set via the supply connection 24 in the air reservoir 23. The hydraulic fluid is also pressurized with this initial pressure through the equalization diaphragm 22 in this way. The displaced hydraulic fluid can now be taken up and stored in the volume equalization space 20 because of the retraction movement of the working piston 15, meaning movement away from the threaded bolt 2.

When the upper end position of the working piston 15 is reached, the elastomer disk 35 serves to reliably interrupt the influx of hydraulic fluid to the check valve 19 and no more hydraulic fluid can consequently be pumped into the piston-ring space 43. A further retraction of the working piston 15 or a pressure build-up in the active piston-ring space 43 associated with that is prevented, and the pressure in the piston-ring space 43 is maintained until the nut 3 is turned in.

This prevents forces of an excessive magnitude from arising in the flange connections to the screw tensioning cylinder; a lighter and space-saving design is possible because of that.

After an extremely secure pretensioning of the screw 2 and the turning in of the nut 3 by means of a suitable tool engaging through the recesses, the compressed-air connection 7 is closed and the seat valve 26 is opened via the bypass valve 25; the hydraulic fluid can escape from the piston-ring space 43 because of that and flow through the groove 27 to the piston space 44. The pretensioning force that is generated consequently decreases in the movable working piston 15. Adequate compressive force arises that moves the working piston 15 back into the starting position against the cylinder base 28 at the end after the release by means of the bypass valve 25 because of the initial pressure of the air reservoir 23 that is set in the system and the difference between the piston area and the piston-ring area. A situation is likewise brought about because of this compressive force in which the working piston 15 is braced in its starting position against the cylinder base 28 and is consequently secured against twisting. This anti-twist protection is always necessary when the screw tensioning cylinder 38 is screwed up on the threaded bolt 2 or screwed down again after the pretensioning process.

Various seals 29, 30, 31, 32, 33, which provide a reliable seal despite the high pressures, serve to seal off the overall hydraulic system in the interior of the high-pressure hydraulic pump 39 and towards the outside. The initial pressure seal 34, in contrast, has to merely withstand the initial pressure of up to 10 bar that is set. The wiper 36 serves to provide additional protection against soiling of the seals and the hydraulic fluid.

LIST OF REFERENCE NUMERALS

1 Component to be tensioned
2 Threaded bolt
3 Nut
4 Washer
5 Hexagon socket
6 Counterbearing
7 Compressed-air connection
8 Plate
9 High-pressure piston
10 Compression spring
11 Diaphragm
12 Sealing disk
13 Support ring
14 Vent hole
15 Working piston
16 Check valve
17 Elastomer ring
18 Opening pins
19 Check valve
20 Volume equalization space
21 Holes between the piston space and the volume equalization space
22 Equalization diaphragm
23 Air reservoir
24 Supply connection
25 Bypass valve
26 Seat valve
27 Groove
28 Cylinder base
29 Seal
30 Seal
31 Seal
32 Seal
33 Seal
34 Initial pressure seal
35 Elastomer disk
36 Wiper
37 Permanent magnets
38 Screw tensioning cylinder 39 High-pressure pump
40 Pneumatic drive unit
41 Diaphragm cylinder
42 Hydraulic accumulator
43 Piston-ring space
44 Piston space
45 Hole in the working piston
46 Control line
47 Pneumatic valve
48 Check valve
49 Throttle valve
50 Manually actuated pneumatic valve

The invention claimed is:
1. Screw tensioning device for pretensioning and loosening extremely secure pretensable screw connections consisting of a screw tensioning cylinder (38) and a high-pressure hydraulic pump (39), characterized in that
a high-pressure hydraulic pump (39) is integrated into the interior of the screw tensioning cylinder (38),
the high-pressure hydraulic pump (39) is connected to a hydraulic accumulator (42), a drive unit (40) that can be pneumatically actuated is arranged on or in the screw tensioning cylinder (38),
wherein the pneumatic drive unit (40) design is based on a diaphragm cylinder (42) or a piston cylinder and
the pneumatic drive unit (40) is connected to a compressed air feed device,
wherein
the hydraulic accumulator (42) is arranged in the interior of the screw tensioning cylinder (38),
the high-pressure hydraulic pump (39) is comprised of a working piston (15) in a housing,
a hole (45) is arranged in the center of the working piston (15),
a pressurized, high-pressure piston (9) engages in the hole (45),
the hole (45) is connected via two check valves (16 and 19) to a piston space (44) and a piston-ring space (43),
the piston-ring space (43) is connected to the piston space (44) through a seat valve (25) by means of a groove (27) between one another, and a volume equalization space (20) is arranged in the housing.

2. Screw tensioning device for pretensioning and loosening extremely secure pretensable screw connections according to claim 1, characterized in that
a compressed-air bottle is connected via an air-pressure control and air-pressure adjustment valve as a compressed air feed device.

3. Screw tensioning device for pretensioning and loosening extremely secure pretensable screw connections according to claim 1, characterized in that
an air compressor is connected via an air compressor control and air compressor adjustment valve as a compressed air feed device.

* * * * *